(12) United States Patent
Sherwood

(10) Patent No.: US 9,365,350 B2
(45) Date of Patent: Jun. 14, 2016

(54) INVERTED VACUUM BELT CONVEYOR SYSTEM

(71) Applicant: Bernard J. Sherwood, Lisle (CA)

(72) Inventor: Bernard J. Sherwood, Lisle (CA)

(73) Assignee: Bernard J. Sherwood, Lisle ON. (CA)

( * ) Notice: Subject to any disclaimer, the term of this patent is extended or adjusted under 35 U.S.C. 154(b) by 0 days.

(21) Appl. No.: 14/508,932

(22) Filed: Oct. 7, 2014

(65) Prior Publication Data

US 2016/0096685 A1 Apr. 7, 2016

(51) Int. Cl.
| | |
|---|---|
| *B65G 17/46* | (2006.01) |
| *B65G 23/06* | (2006.01) |
| *B65G 23/19* | (2006.01) |
| *B65G 17/32* | (2006.01) |
| *B65G 15/58* | (2006.01) |
| *B65G 15/64* | (2006.01) |

(52) U.S. Cl.
CPC .............. *B65G 17/323* (2013.01); *B65G 15/58* (2013.01); *B65G 15/64* (2013.01)

(58) Field of Classification Search
CPC ............................. B65G 23/19; B65G 17/007
USPC ........... 198/678.1, 689.1, 803.5, 867.03, 834, 198/835; 271/198
See application file for complete search history.

(56) References Cited

U.S. PATENT DOCUMENTS

| | | | | |
|---|---|---|---|---|
| 2,813,637 A * | 11/1957 | Perry | ...................... | B28B 13/04 271/197 |
| 4,154,438 A * | 5/1979 | Seragnoli | .............. | B65B 43/185 271/102 |
| 4,442,657 A * | 4/1984 | Busseniers | ........... | B65G 17/323 414/793.1 |
| 5,687,641 A * | 11/1997 | Williamson | ........... | A21C 3/022 198/689.1 |
| 6,340,155 B1 * | 1/2002 | Madsen | ................ | B41J 11/0025 198/471.1 |
| 6,481,565 B1 * | 11/2002 | Sherwood | .......... | B65G 21/2036 198/689.1 |
| 6,578,705 B2 * | 6/2003 | Lunghi | ................... | B65G 15/00 198/810.04 |
| 7,631,745 B2 * | 12/2009 | Steffen | ..................... | B41F 17/26 198/377.08 |
| 7,722,027 B2 * | 5/2010 | Gibson | ................... | B65G 15/58 198/811 |
| 7,854,429 B2 * | 12/2010 | Abe | ..................... | B65G 21/2036 198/689.1 |
| 7,857,122 B2 * | 12/2010 | Williams | ............. | B65H 11/005 198/689.1 |
| 7,866,662 B2 * | 1/2011 | Lapointe | ............ | B65G 21/2036 271/194 |
| 7,900,920 B2 * | 3/2011 | Sakai | ........................ | B41J 11/06 198/689.1 |
| 8,100,253 B2 * | 1/2012 | Walsh | ................ | A61F 13/15764 198/377.08 |
| 9,102,481 B2 * | 8/2015 | Moore | ................. | B65H 29/241 |

\* cited by examiner

Primary Examiner — Douglas Hess

(57) ABSTRACT

This invention is a vacuum belt conveyor designed to operate inverted and move articles suspended from its lower side rather than laying on top. This is achieved by the use of a matching toothed drive roller and toothed belt having its teeth facing outward and pierced between strategic teeth with vacuum cups secured through the holes. Vacuum is applied when needed to sections of a vacuum rail spring loaded against the smooth inner surface of the belt, the rail having a machined vacuum groove in horizontal alignment with the holes in the belt to provide vacuum to the cups. The belt and suspended articles secured to it by suction are held to the main frame by two retaining rails having clearance allowing passage of the cups.

7 Claims, 4 Drawing Sheets

INVERTED VACUUM BELT CONVEYOR SYSTEM

CROSS-REFERENCE TO RELATED APPLICATIONS

N.A. (Not Applicable)

STATEMENT REGARDING FEDERALLY SPONSORED RESEARCH OR DEVELOPMENT

N.A.

REFERENCE TO A SEQUENCE LISTING, A TABLE, OR A COMPUTER PROGRAM LISTING

N.A.

COMPACT DISC APPENDIX

N.A.

BACKGROUND OF THE INVENTION

1. This invention is directed to an inverted conveyor system and in particular to an improved system incorporating a toothed vacuum belt for effecting the pneumatic transfer of articles while suspended from the lower side of the conveyor as opposed to lying on top.

2. The use of pneumatic transfer with conveyor systems is well known and widely practiced both in regard to belt conveyors and agricultural purposes such as blowing or sucking grain, fertilizers, etc. along pipes. In the case of belt conveyors with pneumatic transfer, many systems are characterized by the use of wide open suction chambers with associated unduly large air-mass displacement requirements in the form of generated vacuum or of compressed air. The response time of such systems is unduly slow while the necessary air displacement is large and noisy with excessive forces being generated against system components including the associated frictional drag upon the belt with consequent increased wear. Huge amounts of power may be consumed generating very high volumes of noise.

All this is exacerbated when a conveyor is inverted to attempt running upside down as gravity works on both the belt and suspended articles to pull them away from the conveyor thereby breaking the vacuum seal. Thus more energy needs be consumed to create a stronger vacuum or a wider and shorter conveyor used, all of which are totally unsatisfactory in many situations.

It should be noted that the size of a conveyor system per se, both in height and width, can bear significant economic implications, with down-sizing being the most desirable while maintaining the required length for the application at hand. This has particular bearing on the size and location of the necessary ancillary systems associated with the conveyor.

My earlier systems, as disclosed in my U.S. Pat. No. 6,141,565 of Nov. 19, 2002 and U.S. Pat. No. 7,004,309 of Feb. 28, 2006, while overcoming many of the defects of prior art, has been significantly improved upon by way of the changes as set forth below to allow articles to be transferred effectively and efficiently by and inverted vacuum conveyor and suspending the load below.

BRIEF SUMMARY OF THE INVENTION

The present invention provides an inverted modular pneumatic belt system for conveyors, the conveyor system consisting of a plurality of individual vacuum sections machined into a vacuum rail under which a perforated toothed belt runs. Suction cups are secured to the belt in conjunction with the perforations and hold the articles to the moving belt by vacuum.

The overall layout of the subject conveyor is similar to my earlier system as disclosed in my above identified U.S. patents. In my present inverted system, the vacuum blocks are replaced by a vacuum rail that is machined in sections to apply vacuum to the belt still in a modular fashion. Each section has a longitudinal groove machined in alignment with the holes in the belt and so through to the vacuum cups below. The entire vacuum rail floats in a matching chamber in the main frame and is spring loaded downward onto the smooth surface of the belt suspended below. Thusly, a vacuum seal is maintained between the load on the belt and the vacuum rail even as the belt flexes as loading is applied or released with the resulting belt distortion associated with such actions.

The toothed surface of the belt is therefore facing outwards from below the conveyor and toward the load. The belt is pierced between the teeth as necessary, longitudinally along the centre line of its width, and resulting in the holes being in alignment with the machined grooves in the vacuum rail resting on its upper smooth surface. Vacuum cups are secured to each belt hole and vacuum applied to the vacuum rail passes through the belt to the cups thusly securing the load to the belt suspended below the conveyor.

Gravity working on both the load and the belt would eventually distort the belt enough to break the vacuum seal and release the load. To overcome this situation, two belt retaining rails are secured to the lower side of the main frame, each having a passageway machined to allow clearance of the belts teeth. The rails are sized to leave a gap between them and allow passage of the vacuum cup mounts. Therefore the cups are free to move along the bottom of the conveyor with the desired suspended articles attached.

As the toothed side of the belt is in contact with the belt retaining rails, the friction surface is greatly reduced and can be reduced even further in some cases by manufacturing the belt retaining rails out of material such as HDPE or coating the wear surface of the rails with friction reducing substances. A further reduction in transport friction and cost is achieved by reducing the width of the belt. Previous conveyors used a series of holes or vacuum areas machined into the surface of the belt thus requiring a widening of the belt to gain more vacuum surface area for increased retention power. The present version uses a belt only wide enough to support the load without undue deflection. The load securing area is controlled by the size and shape of the vacuum area of the cups and these can be changed out to suit a different article as desired.

Should the conveyor be used in a reciprocating motion such as in de-stacking sheet metal, the cups could be any size up to that which the strength of their mounts allow as they would not be passing over any roller. If it is to be used in one continuous direction, clearance for the cups passage would have to be machined into the main drive roller and two idler rollers on the belt tightener.

My previous patents, above, used a hollow extruded aluminium for combined conveyor support and air passages. This inverted version has two right angle mounting rails fastened to the upper side of a solid main frame with its associated machined chamber for the vacuum rail. The belt drive and tightening assemblies used in my previous patents above as well as the associated conveyor attaching and levelling hardware are secured to the rails where desired for the application. The space between these mounting rails is used to contain the air supply and exhaust retaining tubing as well as the vacuum generators and their electrical air supply control valves. These valves are turned on or off by electronic parts sensing units with high current carrying capabilities. These are now capable of operating the air control valve directly without having to go back and forth to a computer controller saving both the reaction time and wiring time and material. Said sensing unit can be mounted externally as convenient to detect parts present or not, efficiently turning vacuum on or off, section by section, as the part progresses along the conveyor. To cut down reaction time and compressed air consumption, the control valve and vacuum generator are secured between the mounting rails as close to each associated vacuum rail section supply hole as possible.

As in my previous patents above, in operation, any respective section of the vacuum rail only comes into operation when the belt portion under the section is carrying something that obstructs the sensor so as to activate the air valve allowing compressed air to flow through the multistage vacuum generation unit plumbed to the vacuum rail thereby applying vacuum to the section of the vacuum cups on the belt in the area directly below. This suction will have passed along the machined groove of the vacuum rail, in one particular section at a time, through the associated holes in the belt and the vacuum cups attached there, to thus retain the load sensed. As the belt movement carries the load along, the next sensor recognizes a part present and triggers its associated vacuum assembly and a new section of the vacuum rail is energized drawing the load to the belt in that section. Each time the load clears a sensor as the parts move along with the belt, the sensor recognizes no part present and cuts off compressed air to its associated vacuum generating assembly for that section of the vacuum rail. Thus compressed air is only consumed in those sections where a part is present thereby saving on power, noise and wear on the belt and associated components. The wear on the belt and belt retaining rails is reduced further by having the gravitational weight of the load only in the area of the activated sections and the rest of the belt is floating relatively weight free except for the minor weight of the belt itself. Such efficiencies add up to very large savings over the life span of each conveyor.

This inverted vacuum belt conveyor would use the basic drive, tensioning and associated mounting and levelling hardware as layed out in my previous patents listed above with the following minor changes being made to allow the toothed belt to be used inside-out as compared to the original design. If the conveyor were used in a continuous direction, as the belt now passes under the two drive idler rollers on it's smooth surface, the toothed side with vacuum cups attached would pass over the drive roller to engage the belt teeth. A groove would have to be machined in the centre of the drive rolls circumference to allow passage of the attached vacuum cups. The in feed and out feed rollers on the belt tensioners would require a similar treatment for the passage of the cups on the assembly.

BRIEF DESCRIPTION OF THE DRAWINGS

Certain embodiments of the invention are described by way of illustration, without limitation thereto other than as set forth in the accompanying claims, reference being made to the accompanying drawings therein.

DETAILED DESCRIPTION OF THE INVENTION

Figure 1:
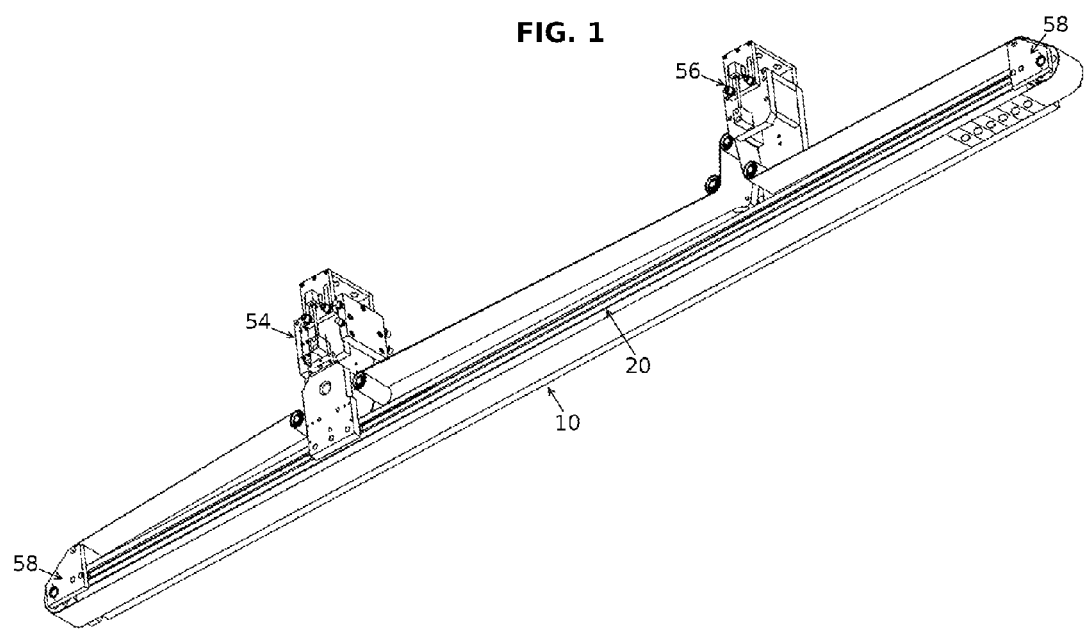
FIG. 1 is a side elevation of the static elements of a belt conveyor in accordance with the present invention.
Figure 2:
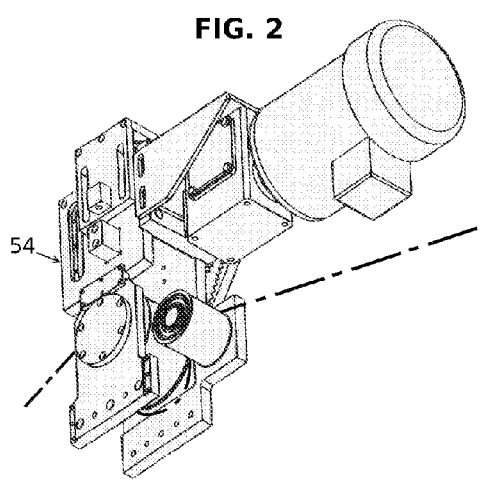
FIG. 2 is the motor and drive assembly with its conveyor mounting and levelling components of the FIG. 1 embodiment. The location of the toothed conveyor belt is shown in the long and short dashed line.
Figure 3:
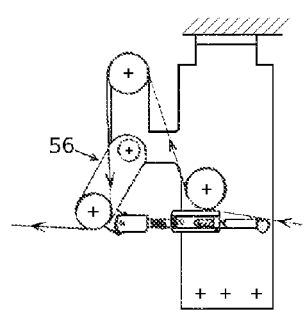
FIG. 3 shows the open side of the belt tensioner which will have a similar conveyor mounting and levelling component as the drive. The belt location is shown in a continuous arrowed line.
Figure 5:
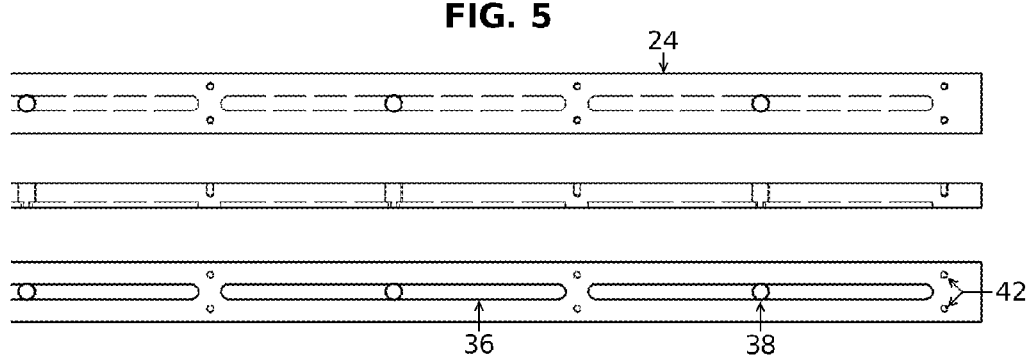
FIG. 5 is a look at the vacuum rail machined in a plurality of identical individual sections.
Figure 6:
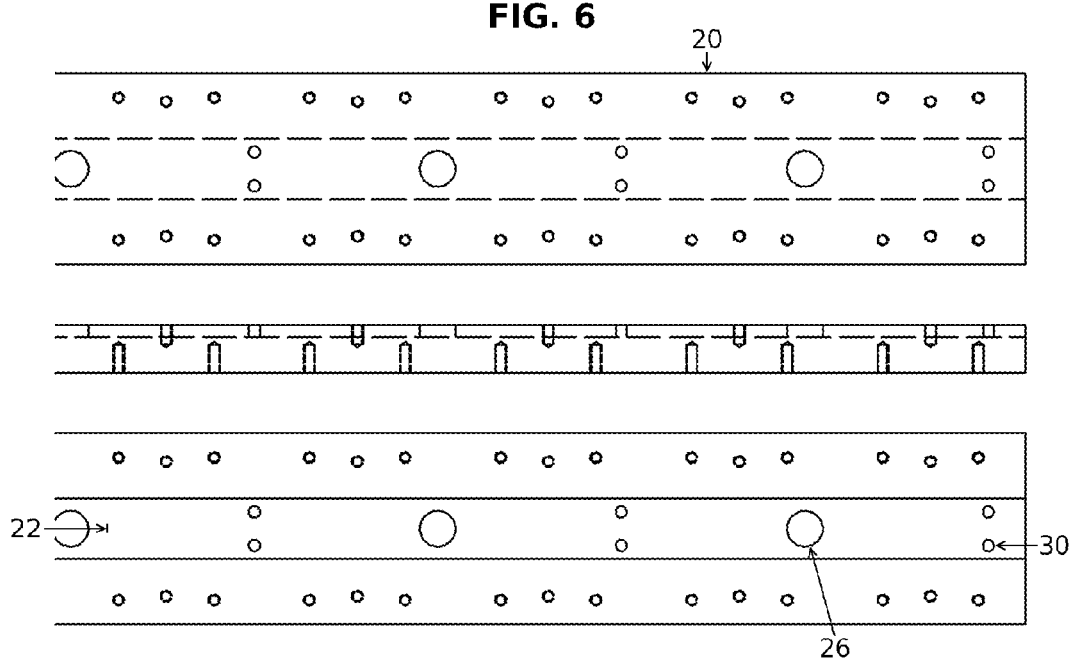
FIG. 6 being a view of the main frame of the conveyor with a longitudinal cavity machined for clearance on the vacuum rail and holes bored through to afford vacuum tubing clearance to individual vacuum rail sections and clearance holes for shoulder bolts.
Figure 7:
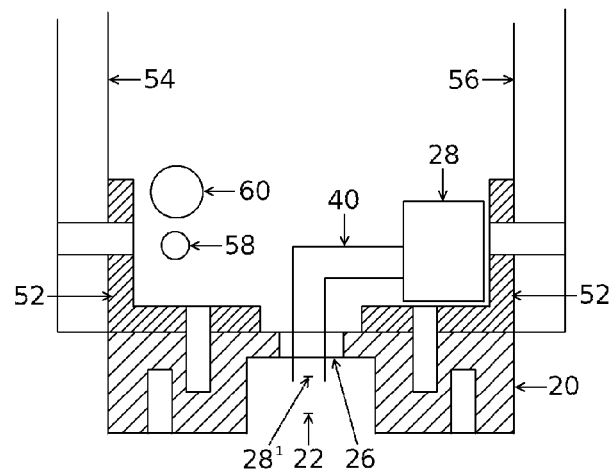
FIG. 7 is an end view showing the relationship of the main frame and components attached to its upper side.
Figure 8:
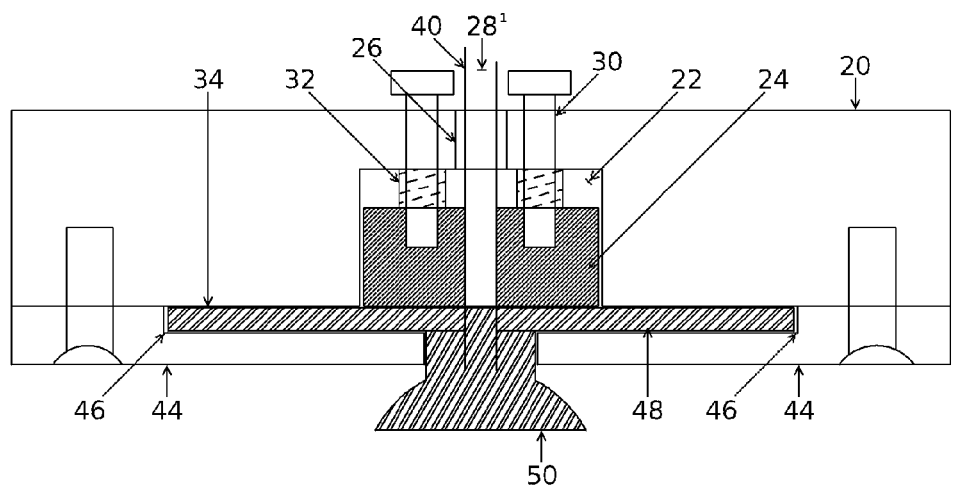
FIG. 8 is an end view showing the main frame and associated components suspended from its lower side.

Referring to FIG. 1, the conveyor, 10 has a solid main frame as shown in FIGS. 6, 7 and 8 item 20. This frame has a longitudinal chamber (see FIGS. 6, 7 & 8), 22 machined into its lower surface to accept the vacuum rail FIGS. 5 & 8 item 24. Further to FIGS. 6, 7 & 8, 26 is a clearance hole to allow vacuum from the vacuum generator FIG. 7, 28 to be tubed (see FIGS. 7 & 8, 28') to the vacuum rail and thus to the smooth surface of the toothed belt and so through the holes to the vacuum cup securing the load below the belt. FIGS. 6 & 8, 30 is a clearance hole for a shoulder bolt to allow movement up and down of the vacuum rail while maintaining it in the main frame chamber in FIGS. 6, 7 & 8, 22. FIG. 8, 32 are springs surrounding the shoulder bolts exerting a downward pressure between the main frame and vacuum rail creating a superior seal on the smooth upper surface of the belt FIG. 8, 34. FIG. 5, 24 is a vacuum rail being machined in identical sections to allow vacuum to be applied as desired only when a part is present under that particular section. A groove, FIG. 5, 36 is machined in each section to cover a plurality of holes/vacuum cups in the belt and having a threaded hole FIG. 5, 38 for a fitting to attach the vacuum tube FIGS. 7 & 8, 40. A series of threaded holes FIG. 5, 42 contain the shoulder bolts positioning the vacuum rail FIG. 5, 24 within the chamber in the main frame FIGS. 6, 7 & 8, 22 while still allowing the vacuum rail to float and maintain a vacuum seal.

Figure 4:
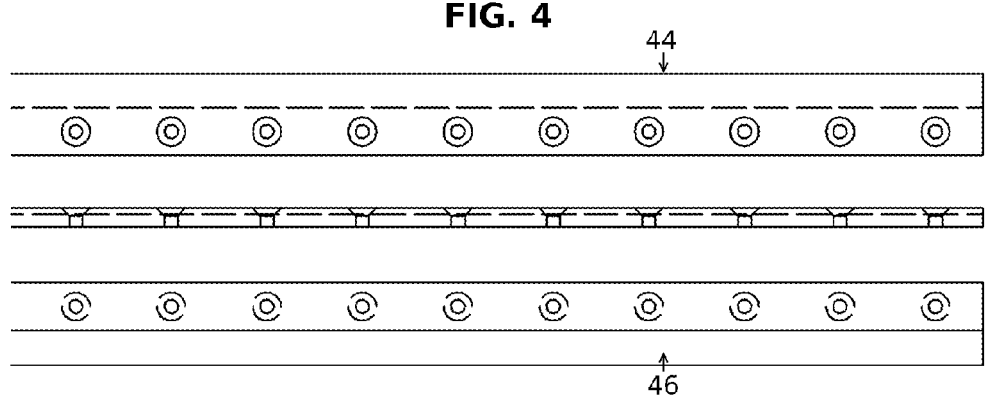
FIG. 4 shows the belt retaining rail and machined surface that allows clearance for movement of the toothed belt.

The lower surface of the main frame FIG. 8, 20 has two belt retaining rails FIG. 4, 44 secured to it having machined clearance FIGS. 4 & 8, 46 to allow passage of the toothed belt FIG. 8, 48. A gap between the rails allows the vacuum cups FIG. 8, 50 secured to the belt through the holes to move the length of the conveyor unencumbered.

Figure 10:
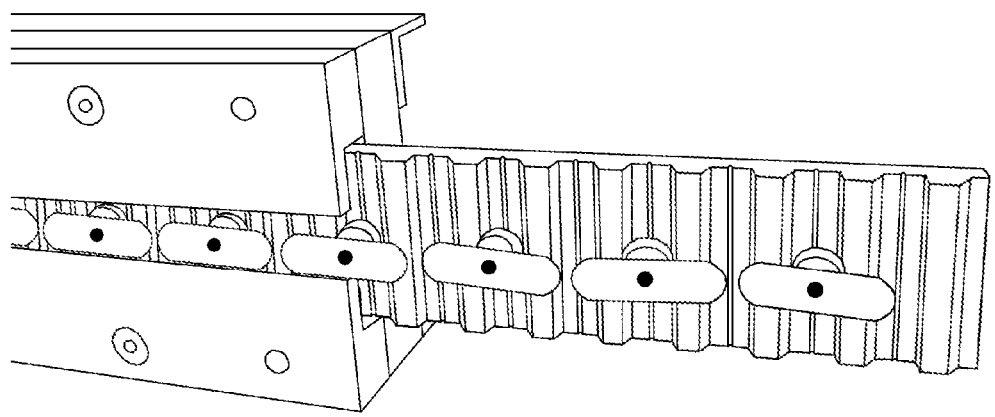
FIG. 10 is an assembled view from the lower side showing the machined components and representational installed vacuum cups.

FIG. 10 shows one style of vacuum cup that can be used on a conveyor with a continually running belt as they would fit around rollers with a corresponding machined groove. If the conveyor were used shuttling back and forth, the cups could be replaced by various larger or shaped items as desired as they would not interfere with the drive or tightening rollers.

FIG. 7, 52 are a pair of right angle mounting rails attached to the main frame 20. The drive assembly FIGS. 1, 2 & 7, 54 and tensioner assembly FIGS. 1, 3 & 7, 56 secured to the mounting rails serve to suspend the entire conveyor and load.

These, along with the end roller assemblies FIG. 1, 58 have been described in my previous patents mentioned above.

Between the mounting rails FIG. 7, 52 are located the sectional vacuum generating assemblies 28. Each vacuum section on the vacuum rail FIG. 5, 24 has its own assembly consisting of a part sensing unit controlling an electric air valve supplied by compressed air from tubing FIG. 7, 58 and connected to a multistage vacuum generator whose vacuum port is tubed, FIG. 7, 40, to the vacuum rail FIG. 8, 40. Depending on size and vacuum requirements, it may be possible to use a vacuum generator with a self contained means of controlling the supply air either on or off. The generator's exhaust port is tubed to a larger tubing, FIG. 7, 60, and any contaminants sucked off the load is collected and disposed of as needed.

Figure 9:
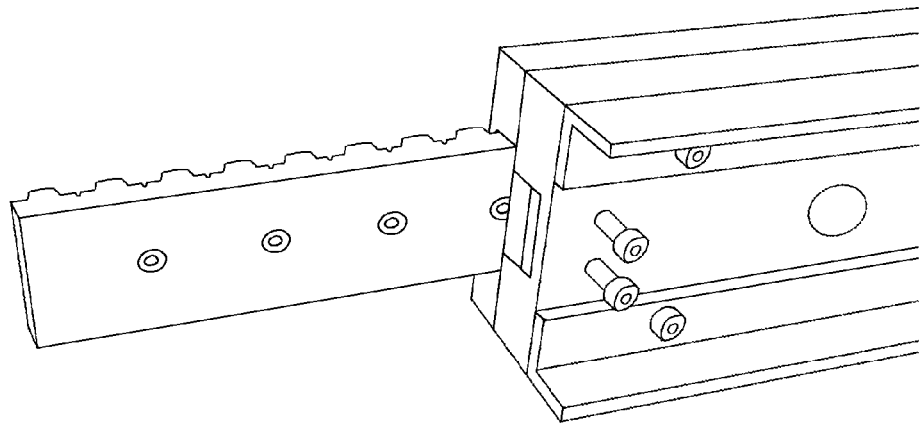
FIG. 9 is an assembled view from the upper side of the machined components.

FIG. 9 shows a view of the upper smooth surface of the belt complete with holes. The vacuum rail rides along this surface guided in the main frame chamber by the shoulder bolts.

What is claimed is:

1. A conveyor system conveying loads being suspended by suction from above and having an endless belt traveling in a loop having a lower working belt portion and an upper return belt portion; guide rolls adjacent the ends of said working and return belt portions; belt driving means located between said guide rolls having a toothed driving roll located within said loop receiving said belt in driving relation therewith, an on coming guidance roll and an off going guidance roll, and said rolls positioned to substantially control the wrap and load transfer between said belt and driving roll, wherein said driving roll includes at least one annulus of gear teeth to engage driving relation with said belt, said belt having projecting tooth portions on the belt outer face in engaging relation with said gear teeth of said driving roll, said driving roll having a machined groove, in the centre of its circumference of sufficient proportion to allow unencumbered passage of vacuum cups attached to the outer surface of said belt.

2. The conveyor system set forth in claim 1, said lower working belt portion having holes pierced through the centre of the belt width, between selected belt teeth, through which hollow securing devices hold vacuum cups of a desired shape and size to said belt enabling a load to be suspended and conveyed below said conveyor.

3. The conveyor system set forth in claim 2, said toothed belt and said vacuum cups suspended below said conveyor is held in close proximity to a conveyor main frame by a pair of belt retaining rails, said rails having a clearance groove machined to allow passage of said toothed belt, said belt retaining rails sized to leave a gap between them through which said vacuum cups attached to said toothed belt may pass unencumbered.

4. The conveyor system set forth in claim 1, having a vacuum rail the length of the conveyor, being machined in identical sections with a groove and vacuum access hole, said groove being in alignment with the holes in said toothed belt, said grooved side of said vacuum rail resting against a smooth upper surface of said toothed belt to obtain a superior seal.

5. The conveyor system set forth in claim 3, said vacuum rail being allowed to float on shoulder bolts and by the force of springs held in position by said shoulder bolts, said vacuum rail is held in close sealing contact with said smooth upper surface of said toothed belt maintaining a seal under belt loading and unloading deflection.

6. The conveyor system set forth in claim 3, said vacuum rail being allowed to float within a machined chamber in a lower surface of a main frame running the length of said conveyor, said shoulder bolts riding through clearance holes in said main frame allowing vertical movement of said vacuum rail, said main frame having a clearance hole for said vacuum tubes attached to each section of said vacuum rail.

7. The conveyor system set forth in claim 1, having a main frame having attached to its upper surface a pair of mounting rails, the area between said mounting rails containing a tubing and vacuum generating assemblies, sensing and supplying vacuum to adjacent sections of a vacuum rail directly below.

* * * * *